United States Patent
Baud et al.

(10) Patent No.: US 8,282,756 B2
(45) Date of Patent: Oct. 9, 2012

(54) METHOD OF MAKING A FIBER PREFORM FOR MANUFACTURING PARTS OF A COMPOSITE MATERIAL OF THE CARBON/CARBON TYPE INCORPORATING CERAMIC PARTICLES, AND PRODUCTS OBTAINED THEREBY

(75) Inventors: Sandrine Baud, Lyons (FR); Alain Giraud, Oullins (FR)

(73) Assignee: Messier-Bugatti, Veilzy Villacoublay (FR)

(*) Notice: Subject to any disclaimer, the term of this patent is extended or adjusted under 35 U.S.C. 154(b) by 1159 days.

(21) Appl. No.: 11/793,834

(22) PCT Filed: Dec. 21, 2005

(86) PCT No.: PCT/EP2005/057036
§ 371 (c)(1),
(2), (4) Date: Mar. 13, 2008

(87) PCT Pub. No.: WO2006/067184
PCT Pub. Date: Jun. 29, 2006

(65) Prior Publication Data
US 2009/0078514 A1    Mar. 26, 2009

(30) Foreign Application Priority Data
Dec. 23, 2004 (FR) ..................... 04 13810

(51) Int. Cl.
*C04B 35/83* (2006.01)
*C04B 35/84* (2006.01)
*F16D 65/12* (2006.01)
*F16D 69/02* (2006.01)

(52) U.S. Cl. .................. 156/89.26; 156/148; 156/307.3

(58) Field of Classification Search ............... 156/89.26, 156/148, 307.3; 427/226, 228
See application file for complete search history.

(56) References Cited

U.S. PATENT DOCUMENTS

| 4,460,639 A | 7/1984 | Chi et al. |
| 4,790,052 A | 12/1988 | Olry |
| 4,983,451 A * | 1/1991 | Sugino et al. .............. 442/388 |
| 5,007,508 A | 4/1991 | Lacombe |

(Continued)

FOREIGN PATENT DOCUMENTS

DE    199 11 611    11/2000

(Continued)

OTHER PUBLICATIONS

Dhakate et al., "Synthesis of methyltriethoxysilane (MTEOS) derived SiC incorporated carbon-carbon composites", Journal of Materials Science Letters, vol. 20, pp. 811-813. Published 2001, month unknown.*

(Continued)

*Primary Examiner* — Michael Tolin
(74) *Attorney, Agent, or Firm* — Weingarten, Schurgin, Gagnebin & Lebovici LLP

(57) ABSTRACT

One or more two-dimensional fiber fabrics of carbon or carbon precursor fibers are impregnated (58, 59) by a solution or a suspension capable of allowing a dispersion of discrete ceramic particles to remain in the fiber fabric, and a fiber preform (51) is made by superposing plies formed of two-dimensional fabric made of carbon or carbon precursor fibers, the plies being bonded to one another, and at least some of the plies being at least partially formed of a previously-impregnated two-dimensional fabric. The field of application is particularly that of friction parts made of C/C composite material with incorporated ceramic particles.

13 Claims, 6 Drawing Sheets

U.S. PATENT DOCUMENTS

| | | |
|---|---|---|
| 5,486,379 A | 1/1996 | Bouillon et al. |
| 5,792,715 A | 8/1998 | Duval et al. |
| 6,009,605 A | 1/2000 | Olry et al. |
| 6,042,935 A | 3/2000 | Krenkel et al. |
| 6,221,475 B1 * | 4/2001 | Domergue et al. ........ 428/292.1 |
| 6,277,440 B1 * | 8/2001 | Reynolds ...................... 427/226 |
| 6,363,593 B1 | 4/2002 | Duval et al. |
| 6,376,431 B1 | 4/2002 | Matsumoto et al. |
| 6,455,159 B1 | 9/2002 | Walker et al. |
| 6,568,050 B2 | 5/2003 | Duval |
| 2003/0136502 A1 * | 7/2003 | Lavasserie et al. ........... 156/253 |
| 2004/0192534 A1 | 9/2004 | Nixon et al. |

FOREIGN PATENT DOCUMENTS

| | | |
|---|---|---|
| DE | 199 63 069 | 6/2001 |
| EP | 0 232 059 | 1/1987 |
| EP | 0 528 336 | 2/1993 |
| GB | 2 291 685 | 1/1996 |
| JP | 61-012761 | 1/1986 |
| JP | 61054248 | 3/1986 |
| JP | 07-041376 | 2/1995 |
| JP | 10025661 | 1/1998 |
| RU | 2240991 | 1/2004 |
| SU | 1766882 | 5/1990 |
| WO | WO 02/075116 | 9/2002 |

OTHER PUBLICATIONS

Tuchinsky, L.I., "Composite materials obtained by impregnation method," Moscow, Metallurgiya Publishers, 1986, p. 188.

* cited by examiner

METHOD OF MAKING A FIBER PREFORM FOR MANUFACTURING PARTS OF A COMPOSITE MATERIAL OF THE CARBON/CARBON TYPE INCORPORATING CERAMIC PARTICLES, AND PRODUCTS OBTAINED THEREBY

This application is a §371 national phase filing of PCT/EP2005/057036 filed Dec. 21, 2005, and claims priority to French application No. 04 13810 filed Dec. 23, 2004.

BACKGROUND AND OBJECT OF THE INVENTION

The invention relates to making fiber preforms for fabricating parts out of carbon/carbon (C/C) composite material, i.e., having carbon fiber reinforcement and a matrix that is made mainly out of carbon.

One field of application of the invention is that of friction parts made of C/C composite material, and more particularly, disks for airplane brakes.

In order to improve the wear resistance of brake disks made of C/C composite material, U.S. Pat. No. 6,376,431 contemplates incorporating a ceramic, and more particularly, silicon carbide (SiC), within the carbon fiber reinforcement. To this end, the reinforcement or preform is impregnated with a sol-gel type solution containing an $SiO_2$ precursor which serves, after heat treatment, to leave particles of SiC distributed substantially uniformly throughout the preform. The percentage by weight of SiC as introduced in this way is small: not more than 1% of the weight of the composite material.

That known method requires preforms to be manipulated after they have been prepared. The manipulation may be performed in a plurality of stages (before and after impregnation) which are lengthy and expensive and need to be performed with care in order to avoid deforming the impregnated preform (which is then both heavy and soft). In addition, it is not possible to vary in a controlled manner the concentration of SiC particles within the preform. The Applicant has also observed that the presence of SiC particles can affect the mechanical properties of the composite material by weakening the carbon fibers constituting the reinforcement. It is particularly important to retain good mechanical properties in those portions of brake disks that are subjected to mechanical stress, such as the cores of disks that transmit braking torque, and in particular, in aircraft brakes where very high levels of torque need to be transmitted. No weakening of the cores of brake disks can be accepted.

An object of the invention is to enable ceramic particles to be incorporated in fiber preforms for composite material parts while avoiding the above-mentioned drawbacks.

SUMMARY OF THE INVENTION

In accordance with the invention, this object is achieved by a method of making a fiber preform for a composite material part, the method comprising:

a) impregnating one or more two-dimensional fiber fabrics of carbon or carbon precursor fibers in a solution or a suspension capable of allowing a dispersion of discrete ceramic particles to remain on the fiber fabric; and b) making the fiber preform by superposing plies formed of the two-dimensional fabric of carbon or carbon precursor fibers and bonding the plies together, at least some of the plies being at least partially formed of a two-dimensional fabric previously impregnated in step a).

Thus, the method is remarkable in that a dispersion of ceramic particles in the plies of the preform is obtained by impregnating the two-dimensional fiber fabric used for making the preform, prior to forming the preform.

This impregnation can be performed on the fiber fabric upstream from a station where the plies of fiber fabric are superposed. Such an impregnation step can then be integrated in the process of making the preform without any need for major modifications.

In addition, impregnation can easily be performed in selective manner so as to have desired concentrations of ceramic particles within the preform, or so as to limit the presence of ceramic particles in certain zones of the preform.

The impregnation of the two-dimensional fiber fabric in the method of the invention can be implemented by passing the fabric continuously through a bath, or by spraying the solution or the suspension onto the fabric.

It is possible to use a sol-gel solution containing a ceramic precursor, the presence of the dispersed ceramic particles being obtained after subsequent heat treatment. In particular, it is possible to use a sol-gel solution which, after drying, leaves a dispersion of oxide particles, such as in particular refractory oxide particles, specifically $TiO_2$, $ZrO_2$, $HfO_2$, and $SiO_2$. The quantity of oxide distributed in the fiber fabric preferably lies in the range 0.1% to 20% by weight of the fiber fabric, with a percentage lying in the range 1% to 15% being particularly preferred. The oxide particles can subsequently be transformed into particles of refractory carbide by reaction with the carbon of the fibers in the fiber fabric under heat treatment. The heat treatment is preferably implemented in an inert atmosphere at a temperature lying in the range 1400° C. to 1750° C.

In a variant, it is possible to use a colloidal suspension of particles of oxide, in particular of $TiO_2$, $ZrO_2$, $HfO_2$, or $SiO_2$, having a mean diameter that preferably does not exceed 100 nanometers (nm), or even 50 nm.

Whenever the presence of SiC particles is not desired in the preform, it is possible to use a sol-gel solution other than those that leave a dispersion of particles of $SiO_2$.

Advantageously, for making a brake preform, the portion of the preform constituting the fiber reinforcement of that portion of the disk that mechanically transmits braking torque is made of two-dimensional fabric plies that are not impregnated with a solution or a suspension capable of leaving a dispersion of ceramic particles in the fabric.

In another of its aspects, the invention provides a brake disk preform as can be obtained in this way. That is, a preform is made of carbon fibers including refractory ceramic particles dispersed in the preform, in which the portion of the preform that constitutes the fiber reinforcement of that portion of the disk that serves to transmit braking torque mechanically is free or almost free of ceramic particles.

In yet another of its aspects, the invention also provides a brake disk of C/C composite material in which the fiber reinforcement is obtained by means of a method of making a brake disk preform as defined above, or from a brake disk preform as defined above.

More particularly, the present invention provides any C/C composite material part as obtained by a method as defined above.

Advantageously, in the ceramic-particle-containing portions of a C/C composite material part or brake disk as obtained in this way, the ceramic particles represent 0.1% to 5% by weight relative to the weight of the composite material.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

The preparation of three-dimensional fiber preforms by superposing and bonding together plies or layers of two-dimensional fabric is a process that is well known in itself.

The two-dimensional fabric can be in the form of a woven cloth, a felt, a knit, or a sheet that is unidirectional or multi-directional (UD or nD). A UD sheet is made up of filaments or yarns extending substantially parallel to one another, possibly bonded in a transverse direction (e.g., by light needling) to give some cohesion to the UD sheet. An nD sheet is made up of n superposed UD sheets extending in different directions and bonded together, for example, by needling, stitching, or the like. Two-dimensional fabrics in complex shapes comprising a cloth or sheet having a web of free fibers deposited thereon and bonded thereto, e.g. by needling, can also be used. Reference can be made in particular to U.S. Pat. Nos. 4,790,052 and 5,792,715 which describe the preparation of a needled fiber plate from which preforms can be cut out, such as annular preforms for brake disks. Reference can also be made to document EP 0 232 059 which describes the preparation of an annular preform by superposing annular plies and by circular needling.

The two-dimensional fabric may also be in the form of a helical fabric, such as a helical cloth or braid or other deformable fabric, which is wound in superposed flat turns so as to build up an annular fiber preform, typically a brake disk preform. The turns forming the superposed plies can be bonded together by needling. Reference can be made to U.S. Pat. Nos. 6,009,605 and 6,363,593.

In an example of the invention, the fiber fabric for use in preparing the preform is impregnated either before or during fabrication of the preform so as to obtain a desired dispersion of ceramic particles within the final preform.

Figure 1:
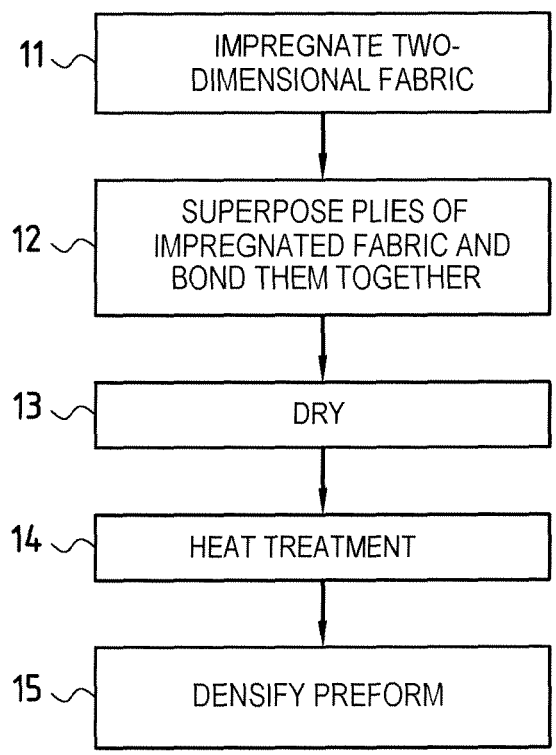
FIGS. 1 to 4 show the sequence of steps for various implementations of the method of the invention.

In the particular implementation shown in FIG. 1, a two-dimensional fiber fabric of carbon fibers or of carbon precursor fibers (such as an nD sheet) is impregnated (step 11) by a sol-gel solution containing a precursor for oxide particles. If a fabric of carbon precursor fibers is used, a precursor that already has a relatively high carbon content is preferably selected, e.g., a precursor having a carbon content of not less than 80%. By way of example, for fibers obtained from pre-oxidized polyacrylonitrile (PAN), it is preferable for impregnation to be performed after precarbonization at a temperature of at least 900° C., for example, serving to bring the carbon content up to a value in the range 80% to 95%. The sol-gel solution is selected as a function of the nature of the desired oxide particles. By way of example, a sol-gel solution containing a precursor for silica $SiO_2$ can be obtained by mixing tetraethoxysilane (TEOS) $Si(OC_2H_5)_4$, constituting an $SiO_2$ precursor, with ethanol, hydrochloric acid, and water. In order to obtain particles of an oxide other than $SiO_2$ after subsequent drying, it suffices to use an appropriate precursor. Thus, particles of $TiO_2$ can be obtained by replacing TEOS with titanium tetraethoxide $Ti(OCH_2CH_3)_4$ and particles of $ZrO_2$ can be obtained by replacing TEOS with zirconium n-butoxide $Zr(O(CH_2)_3CH_3)_4$.

It should be observed that the fiber fabric can be impregnated by spraying the sol-gel solution onto one surface or onto both surfaces of the fabric, e.g. by causing the fiber fabric to travel past one or more spray nozzles or rows of spray nozzles along one or both surfaces of the fabric. Impregnation can also be undertaken by passing the fiber fabric through a bath of the sol-gel solution, preferably followed by draining the fabric.

The impregnation of the fiber fabric is preferably adjusted in such a manner that, after subsequent drying, the quantity of refractory oxide particles that are distributed in the fiber fabric represents 0.1% to 20% by weight of the dry fiber fabric, and preferably 1% to 15%.

Wet impregnated fabric plies are superposed and bonded together progressively as they are superposed. Bonding can be performed by needling (step 12), as described for example in the above-mentioned U.S. Pat. Nos. 4,790,052 and 5,792,715. Other bonding techniques can be envisaged, such as stitching or implanting threads through the superposed plies.

Once the desired thickness of the three-dimensional fiber structure has been reached, drying is performed in a stove dryer (step 13) which leaves a dispersion of oxide particles on the fibers in the resulting fiber preform. Drying is performed for example at a temperature lying in the range 50° C. to 110° C. for a period lying in the range of 12 hours (h) to 24 h.

Heat treatment is then performed (step 14) in an inert atmosphere, e.g., nitrogen, during which the refractory oxide particles are transformed into refractory carbide particles by reacting with the carbon of the fibers in the fiber structure. The heat treatment is performed at a temperature lying in the range 1400° C. to 1750° C. for a duration that may be as long as 4 h. When the fibers of the impregnated fiber fabric are still at a carbon precursor stage, the carbonization of the fibers and the transformation of the oxide particles into refractory carbide can be performed in a single heat treatment operation. It should be observed that three-dimensional fiber preforms of shape corresponding to that of the parts that are to be made out of composite material can be cut out from the three-dimensional fiber structure either before or after heat treatment. In a variant, a preform of desired shape can be obtained directly by superposing and needling together plies that have the desired shape.

The fiber preforms are then densified by means of a carbon matrix (step 15) in well-known manner, e.g., by chemical vapor infiltration (CVI), using a reaction gas phase containing one or more carbon precursors giving pyrolytic carbon by decomposing under determined conditions of temperature and pressure. Densification by a carbon matrix can also be performed by a "liquid" technique, i.e., by impregnating the preform with a liquid composition containing a carbon precursor, such as a pitch or a resin, for example, and transforming the precursor into carbon by heat treatment. In any event, a C/C composite material part is obtained with a dispersion of refractory carbide particles that represent about 0.01% to 10%, and preferably 0.1% to 5%, of the final weight of the composite material.

Figure 2:
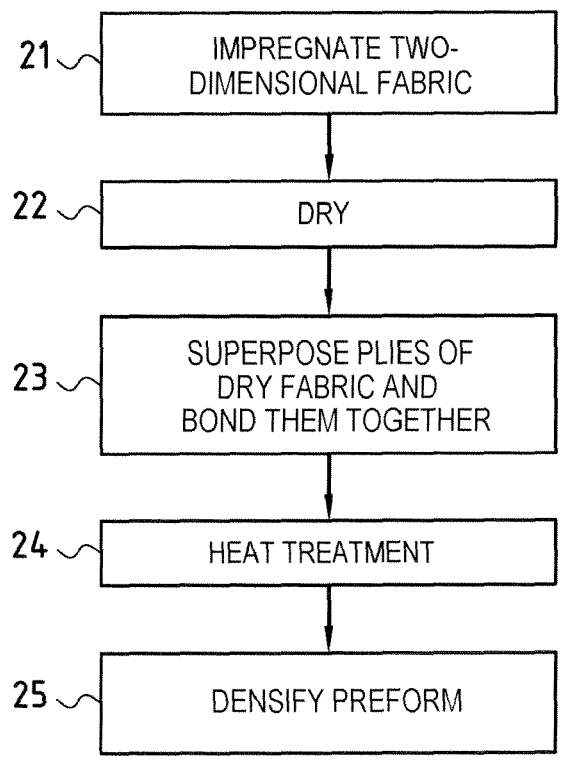

FIG. 2 shows another implementation of a method of the invention. The method of FIG. 2 differs from that of FIG. 1 in that the two-dimensional fabric impregnated in step 21 (analogous to step 11) is dried in a stove (step 21) before a step 23 (analogous to step 12) of superposing and bonding together the dry fiber fabric plies containing a dispersion of refractory oxide particles in order to obtain a fiber preform. The steps 24 and 25 of heat treating and of densifying the preform, analogous to the steps 14 and 15, are then performed.

In particular when the bonding between the superposed plies is obtained by needling, it should nevertheless be observed that it is preferable to perform needling on wet plies prior to drying, specifically to avoid dispersing fibrils or dust in the environment as can occur when needling a dry fiber fabric.

Figure 3:
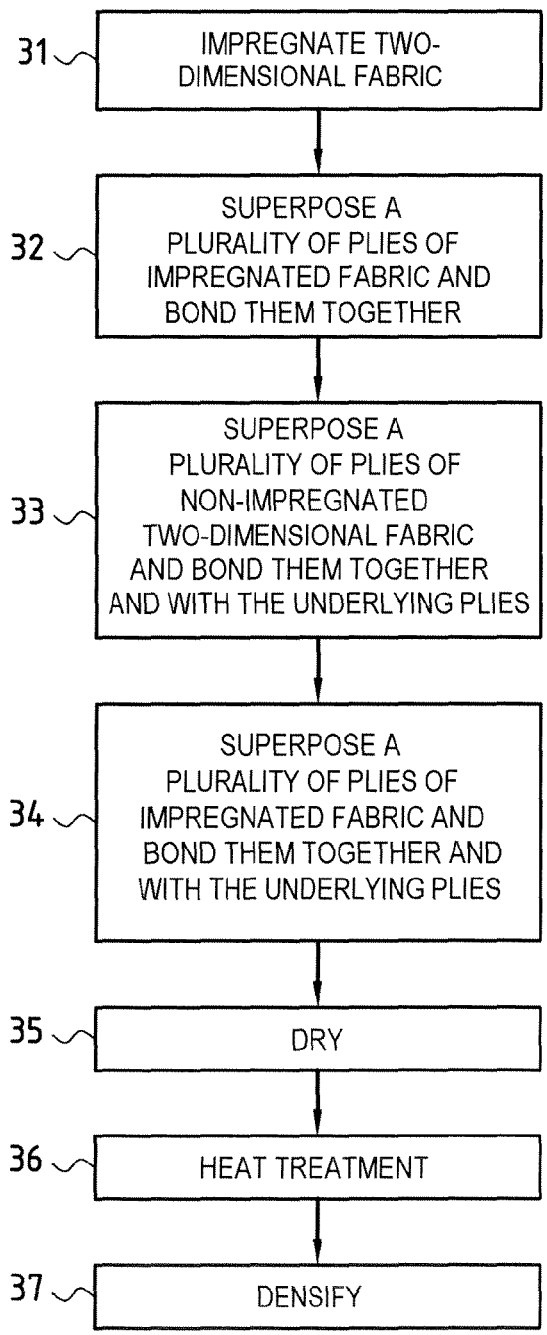

FIG. 3 shows yet another implementation of a method of the invention that is useful in particular for fabricating C/C composite brake disks. In the embodiment of FIG. 3, a composite material part is made as follows:

a step 31 of impregnating a two-dimensional fiber fabric of carbon fibers or carbon precursor fibers with a sol-gel solution (analogous to step 10);

superposing and bonding together a plurality of wet impregnated plies (step 32), in order to obtain a first thickness of fiber structure;

depositing (step 33) on said first thickness of fiber structure a plurality of non-impregnated plies of two-dimensional fiber structure, preferably using the same fabric as the fabric impregnated in step 31, the plies of non-impregnated fiber fabric being superposed and bonded to one another and to the underlying plies of the first thickness of fiber structure in order to form a second thickness of fiber structure bonded to the first thickness;

depositing (step 34) on said second thickness of fiber structure a plurality of wet impregnated plies of fiber fabric, preferably using the same fiber fabric as the fabric impregnated in step 31, these plies of impregnated fiber fabric being bonded to one another and to the underlying second thickness of fiber structure in order to form a third thickness of fiber structure bonded to the second;

a step 35 of drying the fiber structure, analogous to step 13;

a step 36 of applying heat treatment to the fiber preform, analogous to step 14; and a step 37 of densifying the fiber preform, analogous to step 15.

This produces a part 38 of C/C composite material (FIG. 7) having two portions 39a and 39b adjacent to opposite faces 38a and 38b of the part in which particles of refractory carbide are dispersed, and a central portion 39c having no refractory carbide particles or practically no refractory carbide particles. (It is possible that a very small quantity of the impregnation composition might migrate into the central portion of the preform during the needling in step 33.) In those portions of the composite material part that contain refractory carbide particles, the particles preferably represent about 0.1% to 5% by weight of the weight of the composite material.

For a brake disk made of C/C composite material, the presence of refractory carbide particles can thus be restricted to the friction portions of the disk, while the core of the disk which serves to transmit braking torque mechanically has no or practically no refractory carbide particles.

It should be observed that the three-dimensional fiber structure could be prepared after drying the impregnated two-dimensional structure, as in the variant shown in FIG. 2.

It should also be observed that using plies impregnated with sol-gel solutions containing different concentrations of refractory oxide precursor, and plies that are not impregnated, makes it possible to build up fiber preforms with any desired non-uniform distribution of refractory carbide particles across the thickness of the preform.

Figure 4:
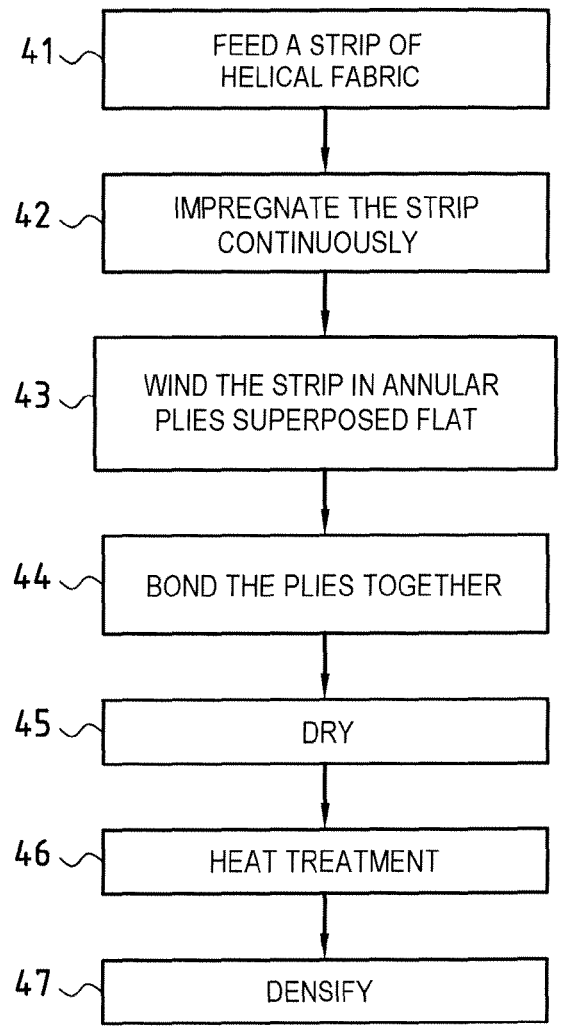

FIG. 4 shows the steps of yet another implementation of the invention, in which the three-dimensional fiber structure is made by winding a helical two-dimensional fiber fabric, e.g., a helical woven cloth.

A helical strip of cloth is provided (step 41) and is continuously impregnated (step 42), preferably by spraying a sol-gel solution containing a refractory oxide precursor, such as the solution used in step 11, with the helical strip of cloth running past one or more spray nozzles.

The impregnated strip of cloth is wound (step 43) in annular turns or plies that are superposed flat. The turns are bonded to one another (step 44), e.g., by needling to form an annular fiber preform.

Once the desired thickness has been reached for the fiber preform, it is dried in a stove. Drying step 45 is analogous to step 14.

Thereafter, heat treatment and densification steps 46 and 47 are performed that are analogous to steps 14 and 15.

This produces an annular part of C/C composite material having refractory carbide particles dispersed therein.

By varying the composition of the sol-gel solution sprayed onto the helical strip of fabric and by temporarily interrupting the spraying of this solution onto the continuously travelling strip, it is possible to control the density of refractory carbide particles in different regions of the thickness of the annular preform. In particular, it is possible to restrict the presence of refractory carbide particles to certain zones, thus making it possible, as mentioned above, to produce C/C composite material brake disks having a core portion containing no or practically no such particles, for example.

In the above, it is assumed that the two-dimensional fiber fabric is impregnated with a sol-gel solution containing an oxide precursor.

In a variant, it is possible to use a colloidal suspension of oxide, e.g., a colloidal solution of $ZrO_2$, $TiO_2$, $HfO_2$, $SiO_2$, or the like. After drying, the oxide particles are transformed into refractory carbide particles by heat treatment, leading to a reaction with the carbon of the fibers of the fiber fabric, as mentioned above.

When using suspensions, the oxide particles should have a mean size that is preferably less than 100 nm, or even less than 50 nm, particularly when making friction parts. The presence of solid ceramic particles of relatively large size in C/C composite friction parts can accelerate wear. The refractory oxide particles inserted may represent 0.1% to 20% by weight of the dry weight of the fiber fabric, and preferably 1% to 15%.

Nevertheless, it should be observed that using a sol-gel solution is preferred for obtaining a uniform distribution of particles after drying the ply or plies concerned by impregnation with a given sol-gel solution.

As mentioned in the beginning of the description, an advantage of the method of the invention is that impregnation can easily be integrated in the usual process for fabricating a fiber preform.

Figure 5:
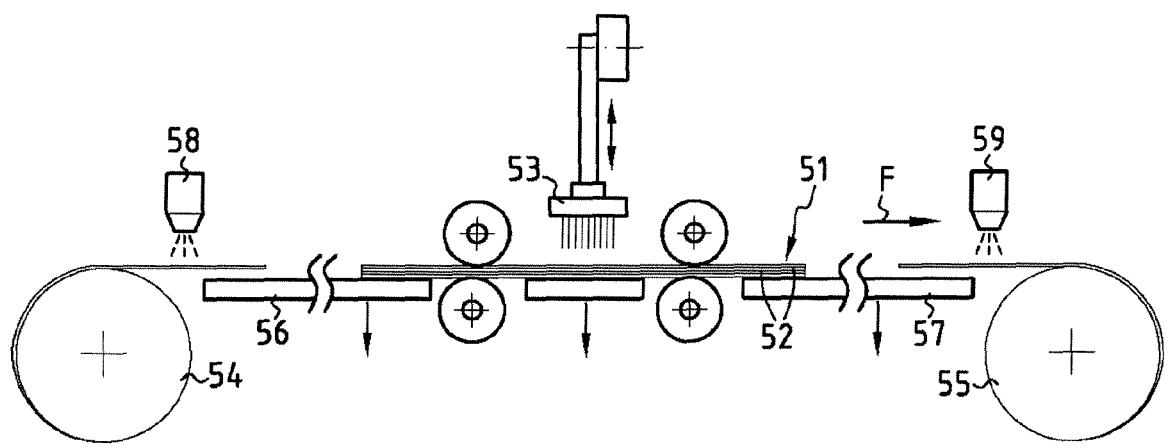
FIGS. 5 and 6 are highly diagrammatic representations of two installations for making needled fiber preforms implementing a method of the invention.

A first example is illustrated by FIG. 5 which is a highly diagrammatic view of an installation for fabricating a three-dimensional fiber structure in the form of a plate by superposing and needling plies of two-dimensional fiber fabric, the installation being of the type used for implementing methods described in the above-mentioned U.S. Pat. Nos. 4,790,052 and 5,792,715.

A needled fiber plate 51 is obtained by superposing plies 52 and bonding them together by needling. The plate 51 is moved horizontally past a needle board 53 driven with vertical reciprocating motion. An embodiment of apparatus for advancing such a fiber plate during needling is described in U.S. Pat. No. 6,568,050.

A needling pass is performed by moving the fiber plate 51 that is being prepared in one direction (arrow F). At the end of its stroke, a new ply 52 is placed on the top surface of the plate and a new needling pass is performed by moving the fiber plate 51 in the opposite direction.

The plies are taken from reels 54, 55 of two-dimensional fiber fabric situated on either side of side plates 56, 57 of the needling table, e.g., by means of rollers or drive clamps (not shown).

Transverse rows of nozzles 58, 59 are disposed on the paths of the two-dimensional fiber fabrics from the reels 54 or 55 to the plates 56 or 57. The nozzles 58, 59 are fed under pressure with a sol-gel solution or with a suspension to enable the plies to be impregnated as they are moved so as to be brought onto the fiber plate 51 that is being built up, with the feed to the nozzles being controlled in such a manner as to impregnate the plies either systematically or selectively. In a variant, the plies could be impregnated by being passed through a bath.

Figure 6:
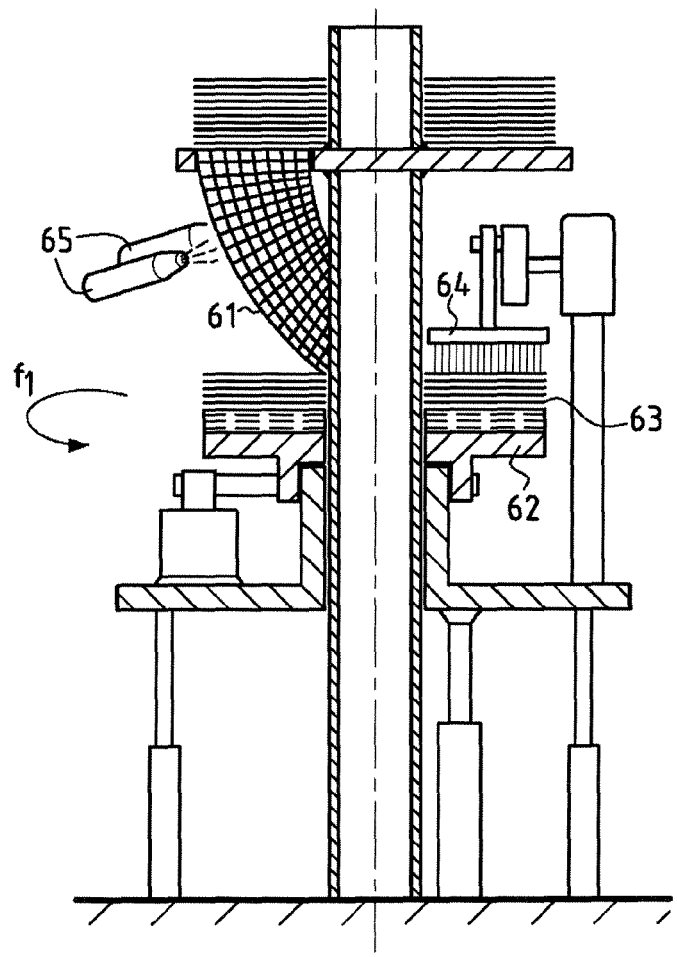

A second example is shown in FIG. 6 which is a highly diagrammatic view of an installation for fabricating an annular three-dimensional fiber structure by winding plies or turns that are superposed flat, being taken from a helical strip of fiber fabric, and with the turns being bonded by needling. Such an installation is of the type shown in above-mentioned U.S. Pat. Nos. 6,009,605 and 6,363,593.

A helical strip 61 of fiber fabric, e.g., a helical woven cloth, is fed onto a horizontal supporting turntable 62 (arrow f1) onto which the cloth is deposited in superposed annular plies or turns in order to form an annular fiber structure 63. At its travels, the turntable passes under a needling head 64 occupying a sector of the annulus and driven with reciprocating vertical motion. Helical cloth feed and needling are both performed continuously until the desired thickness has been obtained for the needled annular preform, with the supporting turntable being progressively moved downwards relative to the needling head.

As it is fed, prior to being deposited on the support turntable 62, the helical cloth passes a row of nozzles 65 serving to spray a sol-gel solution or suspension onto the cloth in order to impregnate it. The nozzles 65 are controlled in such a manner as to impregnate the helical cloth either continuously or otherwise, depending on requirements.

Example 1

A two-dimensional fiber fabric was used in the form of a strip obtained by laying a UD sheet on another continuously travelling UD sheet, the laying being performed in such a manner as to obtain a 3D sheet with directions that form angles of 60° C. between one another. The UD sheets were made of carbon filaments.

An impregnation composition was prepared made up as follows (by volume):

18.5% TEOS ($Si(OC_2H_5)_4$);
2.99% water;
78.5% ethanol; and
0.01% 10N hydrochloric acid.

The TEOS concentration was 0.83 moles per liter (mol/L), its pH was about 3 and the molar ratio of $H_2O$/TEOS was about 2. In order to prepare the composition, a mixture of TEOS was prepared with half of the ethanol separately from a mixture of the remainder of the ethanol with the water and the hydrochloric acid, and then the ingredients were all mixed together under stirring for about 2 h. This produced a sol-gel composition suitable for storage and usable over a period of several days.

A three-dimensional fiber structure was made by superposing plies of said two-dimensional fiber fabric impregnated with said composition, and by bonding the plies together by needling.

Figure 8:
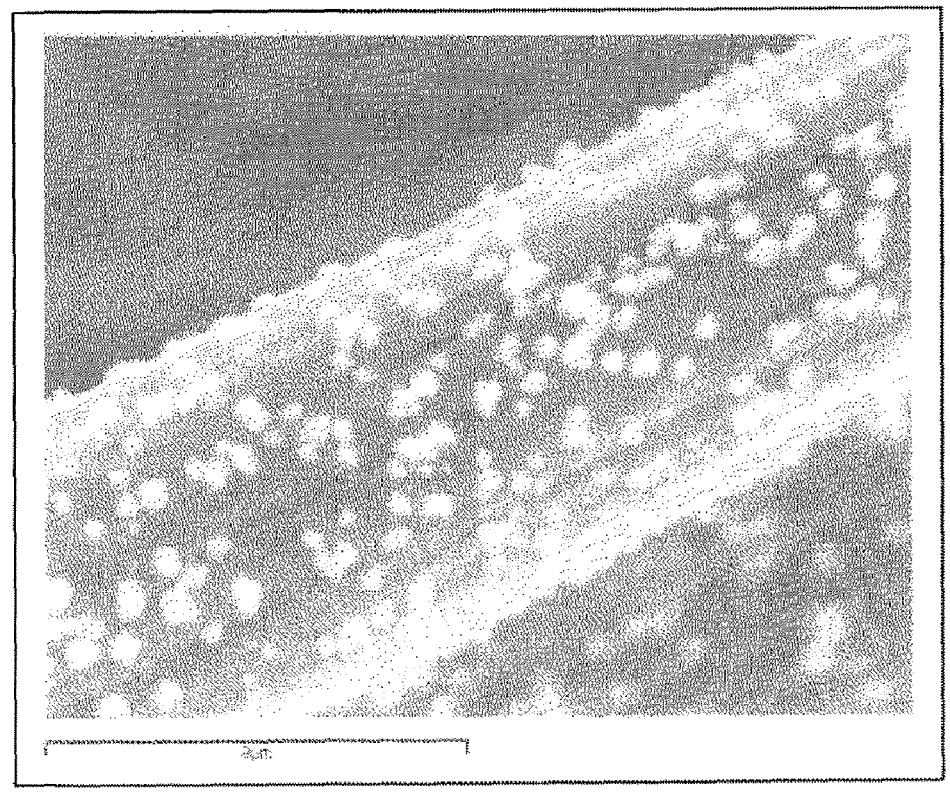
FIG. 8 is a scanning electron microscope photograph showing the dispersion of ceramic particles on fibers in a fiber preform.

After drying at 60° C. in a stove for 16 h, heat treatment was performed under nitrogen at 1600° C. for 4 h. This transformed the $SiO_2$ into SiC. FIG. 8 shows the dispersion of SiC particles on the fibers of the preform.

The resulting fiber structure was densified with a pyrolytic carbon matrix by chemical vapor infiltration until a relative density of about 1.78 was obtained. The concentration by weight of SiC in the resulting composite material was about 2.5%.

Test pieces of C/C composite material enriched with SiC particles as obtained in this example were subjected to friction tests. Braking simulations were performed on test pieces of small dimensions compared with ordinary brake disks, i.e., having an outside diameter of 144 mm, an inside diameter of 98 mm, and a thickness of 14 mm. Energies per unit weight were applied in the range 16 kilojoules per kilogram (kJ/kg) to 1700 kJ/kg while imposing initial speeds of rotation on the test pieces of 520 revolutions per minute (rpm) to 3400 rpm with braking pressures of 3.2 bars to 7.62 bars. That corresponded to a succession of 11 repeated braking operations in order to obtain meaningful mean values for the wear rate and for the friction coefficient.

Figure 9:
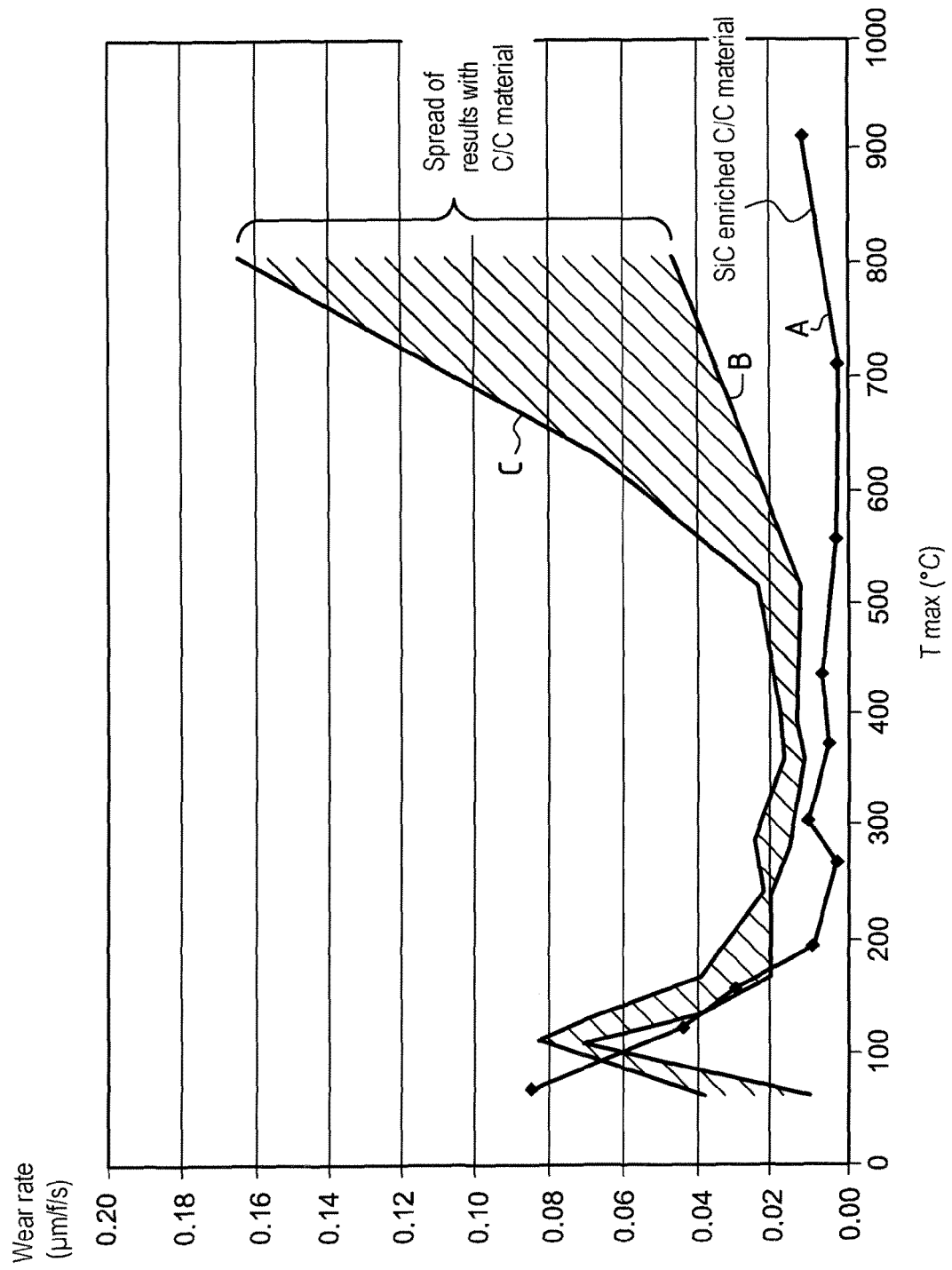
FIG. 9 shows the results of friction tests.

Curve A in FIG. 9 shows the wear rate measured as a function of temperature as measured 1 mm beneath the friction surface, said temperature being related to the applied braking energy. The wear rate was measured by measuring the rate at which the thickness of the friction face varied per second.

By way of comparison, curves B and C in FIG. 9 show the envelope of the (shaded) range of results obtained with a C/C composite material that was not enriched with SiC.

It can be seen that with the exception of the low temperature range (i.e. temperatures up to about 180° C.), the presence of SiC particles leads to a considerable decrease in wear, and that this continues up to high temperatures. This is a significant result.

Nevertheless, measurement of the friction coefficient revealed a certain amount of instability at high temperature that can be associated with the nature (SiC) of the ceramic particles. For an application to the field of high energy braking, it may therefore be preferable to have particles other than SiC present, which implies using a sol-gel solution containing a precursor for an oxide other than $SiO_2$, or a colloidal suspension of an oxide other than $SiO_2$.

Example 2

A three-dimensional fiber structure was made as in Example 1, but by superposing in succession five plies of impregnated fiber fabric, 12 plies that were not impregnated, and five impregnated plies. After drying, a brake disk preform was cut out from the resulting fiber structure and subjected to heat treatment to transform the $SiO_2$ into SiC, prior to being densified with a pyrolytic carbon matrix by CVI.

Figure 7:
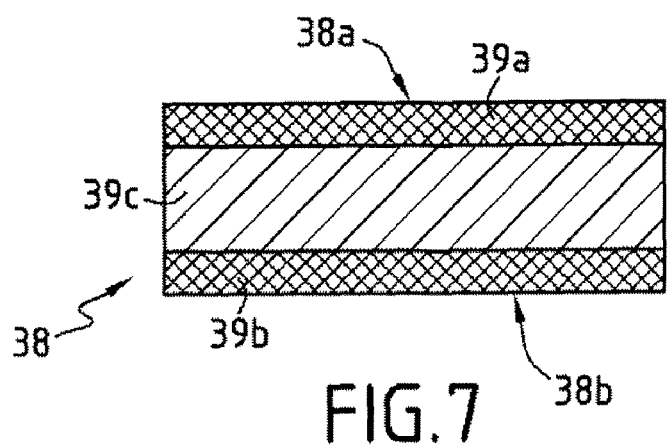
FIG. 7 is a highly diagrammatic view of a composite material part obtained by a method of the invention.

A brake disk was thus obtained in which the core portion had practically no particles of SiC, in a manner similar to that shown very diagrammatically in FIG. 7.

Example 3

Figure 10:
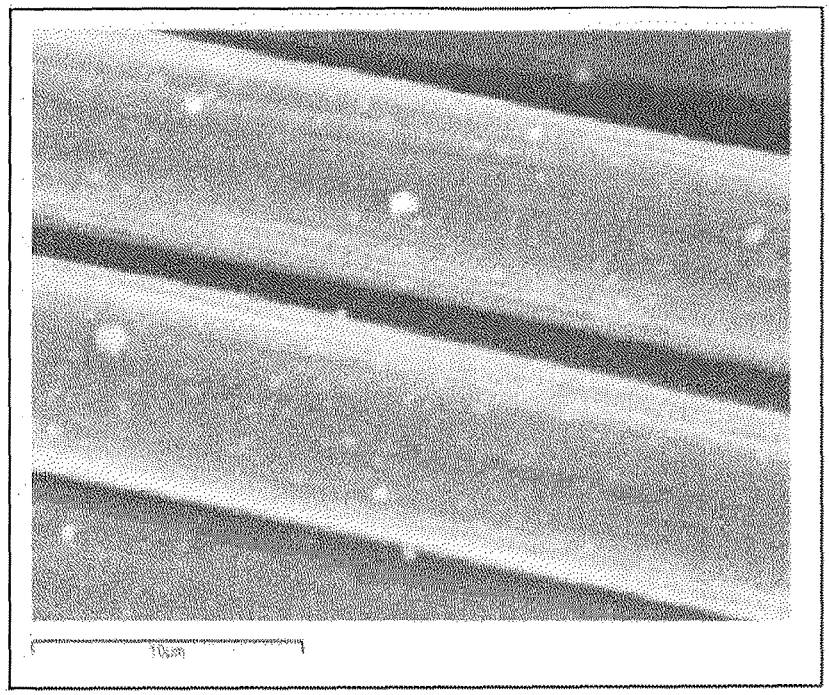
FIGS. 10 and 11 are photographs taken using a scanning electron microscope and showing the dispersion of ceramic particles on fibers in a fiber preform.

The procedure was as in Example 1, but the impregnation composition had TEOS at a concentration of 0.17 mol/L, a pH of about 3, and a ratio of $H_2O$/TEOS of 2. After the fiber structure had been formed by needling, drying, and heat treatment, the presence of SiC particles was observed in two ranges of different sizes, as can be seen in FIG. 10. The way in which the impregnation composition is selected can thus serve not only to have particles of different kinds, but also of different morphologies.

Example 4

The procedure was as in Example 1, but using UD sheets of intermediate carbon filaments, i.e. filaments at an advanced carbon precursor stage. Such filaments are constituted by commercially available carbon fibers or preoxidized PAN fibers that have been subjected to precarbonization by heat treatment at 900° C.

The final transformation of the carbon filaments occurred during the heat treatment at 1600° C. during which the $SiO_2$ particles were transformed into SiC particles, and a three-dimensional carbon fiber structure was obtained including additional SiC particles similar to that of Example 1.

Example 5

Figure 11:
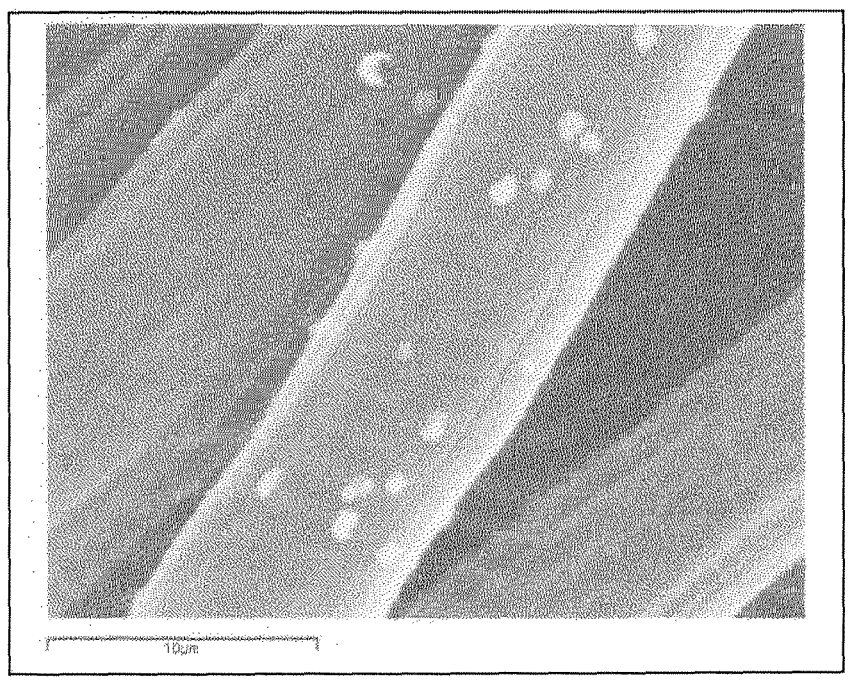

The procedure was as in Example 1, but the $SiO_2$ precursor sol-gel solution was replaced by a colloidal suspension of $ZrO_2$ at a concentration by weight of 5%. After heat treatment at 1600° C. for 4 h, a dispersion of ZrC particles was obtained within the three-dimensional fiber structure, as shown by the photograph of FIG. 11.

The invention claimed is:

1. A method of making a brake disk of carbon/carbon composite material incorporating ceramic particles, the brake disk having a friction first portion and a second portion adjacent the friction first portion and mechanically transmitting braking torque, the method comprising the steps of:
   a) impregnating one or more two-dimensional fiber fabrics of carbon or carbon precursor fibers in a colloidal suspension or a sol-gel solution containing ceramic particles or a precursor of ceramic particles;
   b) superposing together first fiber plies formed of a two-dimensional fiber fabric impregnated with said colloidal suspension or sol-gel solution in a first portion of a fiber preform corresponding to the friction portion of the brake disk and second fiber plies of a two-dimensional fiber fabric not impregnated with said colloidal suspension or sol-gel solution in a second portion of the fiber preform corresponding to the second portion of the brake disk;
   c) drying the impregnated fiber fabric to leave on the fibers of said first fiber plies a dispersion of discrete ceramic particles;
   d) bonding together the first and second fiber plies to obtain a brake disk fiber preform having said first portion formed of fiber plies and ceramic particles dispersed on the fiber plies of the first portion and a second portion formed of fiber plies free or practically free of ceramic particles, said fiber plies being bonded together progressively as they are superposed; and
   e) subsequently densifying the brake disk fiber preform with an added carbon matrix.

2. A method according to claim 1, in which the two-dimensional fiber fabric is impregnated by passing the fabric continuously through a bath.

3. A method according to claim 1, in which the two-dimensional fiber fabric is impregnated by spraying the solution or suspension onto the fabric as it continuously travels.

4. A method according to claim 1, in which impregnation is performed by means of a sol-gel solution containing an oxide precursor.

5. A method according to claim 4, in which the impregnation is performed by means of a sol-gel solution containing a precursor of an oxide selected from $TiO_2$, $ZrO_2$, $HfO_2$, and $SiO_2$.

6. A method according to claim 4, in which impregnation is performed by means of a sol-gel solution containing a precursor for an oxide other than $SiO_2$.

7. A method according to claim 1, in which impregnation is performed by means of a colloidal suspension of oxide particles.

8. A method according to claim 7, in which the oxide particles are selected from $TiO_2$, $ZrO_2$, $HfO_2$, and $SiO_2$.

9. A method according to claim 7, in which impregnation is performed by means of a colloidal suspension of particles of an oxide other than $SiO_2$.

10. A method according to claim 4, in which the oxide precursor forms oxide particles and the oxide particles are transformed into refractory carbide particles by reacting with the carbon of the fibers of the fiber fabric under heat treatment.

11. A method according to claim 10, in which the heat treatment is performed under an inert atmosphere at a temperature lying in the range 1400° C. to 1750° C.

12. A method according to claim 1, in which the ceramic particles dispersed on the fiber fabric represent 0.01% to 10% and preferably 0.1% to 5% by weight of the composite material to be made.

13. A method according to claim 1, in which the plies are bonded together by needling prior to drying the impregnated two-dimensional fiber fabric.

* * * * *

UNITED STATES PATENT AND TRADEMARK OFFICE
CERTIFICATE OF CORRECTION

PATENT NO. : 8,282,756 B2
APPLICATION NO. : 11/793834
DATED : October 9, 2012
INVENTOR(S) : Sandrine Baud et al.

It is certified that error appears in the above-identified patent and that said Letters Patent is hereby corrected as shown below:

On the title page, Assignee (73), "Veilzy" should read --Velizy--;

In the Specification

Column 3, line 34, "n" should read --$\underline{n}$--; and

Column 9, line 52, "of a fiber" should read --of the fiber--.

Signed and Sealed this
Third Day of December, 2013

Margaret A. Focarino
*Commissioner for Patents of the United States Patent and Trademark Office*